US009932261B2

(12) United States Patent
Annamalai et al.

(10) Patent No.: US 9,932,261 B2
(45) Date of Patent: Apr. 3, 2018

(54) DOPED ULTRA-LOW EXPANSION GLASS AND METHODS FOR ANNEALING THE SAME

(71) Applicant: Corning Incorporated, Corning, NY (US)

(72) Inventors: Sezhian Annamalai, Painted Post, NY (US); Steven Bruce Dawes, Corning, NY (US); Carlos Alberto Duran, Ottawa (CA); Kenneth Edward Hrdina, Horseheads, NY (US); William Rogers Rosch, Corning, NY (US); Bryan Ray Wheaton, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/297,534

(22) Filed: Oct. 19, 2016

(65) Prior Publication Data

US 2017/0144917 A1 May 25, 2017

Related U.S. Application Data

(60) Provisional application No. 62/258,755, filed on Nov. 23, 2015.

(51) Int. Cl.
*C03C 3/06* (2006.01)
*C03C 3/089* (2006.01)
(Continued)

(52) U.S. Cl.
CPC .............. *C03C 3/089* (2013.01); *C03B 19/14* (2013.01); *C03B 25/02* (2013.01); *C03C 3/06* (2013.01);
(Continued)

(58) Field of Classification Search
CPC ............ C03C 2201/06; C03C 2201/08; C03C 2201/10; C03C 2201/12; C03C 2201/14; C03C 2201/23; C03C 2201/42
(Continued)

(56) References Cited

U.S. PATENT DOCUMENTS 9,382,150 B2    7/2016  Annamalai
2005/0153824 A1  7/2005  Alkemper et al.
(Continued)

FOREIGN PATENT DOCUMENTS

WO      2016086013 A1    6/2016

OTHER PUBLICATIONS

Hagy, "High Precision Photoelastic and Ultrasonic Techniques for Determining Absolute and Differential Thermal Expansion of Titania-Silica Glasses," Applied Optics, vol. 12, No. 7, (1973) pp. 1440-1446.
(Continued)

*Primary Examiner* — Noah S Wiese
(74) *Attorney, Agent, or Firm* — Robert L. Carlson

(57) ABSTRACT

A doped silica-titania ("DST") glass article that includes a glass article having a glass composition comprising a silica-titania base glass containing titania at 7 to 14 wt. % and a balance of silica, and a dopant selected from the group consisting of (a) F at 0.7 to 1.5 wt. %, (b) $B_2O_3$ at 1.5 to 5 wt. %, (c) OH at 1000 to 3000 ppm, and (d) $B_2O_3$ at 0.5 to 2.5 wt. % and OH at 100 to 1400 ppm. The glass article has an expansivity slope of less than about 1.3 $ppb/K^2$ at 20° C. For DST glass articles doped with F or $B_2O_3$, the OH level can be held to less than 10 ppm, or less than 100 ppm, respectively. In many aspects, the DST glass articles are substantially free of titania in crystalline form.

22 Claims, 6 Drawing Sheets

(51) Int. Cl.
  *C03B 25/02* (2006.01)
  *C03C 4/00* (2006.01)
  *C03B 19/14* (2006.01)

(52) U.S. Cl.
  CPC ............ *C03C 4/00* (2013.01); *C03B 2201/07* (2013.01); *C03B 2201/075* (2013.01); *C03B 2201/10* (2013.01); *C03B 2201/42* (2013.01); *C03C 2201/10* (2013.01); *C03C 2201/42* (2013.01)

(58) Field of Classification Search
  USPC .......................................................... 501/54
  See application file for complete search history.

(56) References Cited

U.S. PATENT DOCUMENTS

| | | | |
|---|---|---|---|
| 2009/0143213 A1 | 6/2009 | Hrdina et al. | |
| 2011/0207592 A1* | 8/2011 | Duran | B82Y 10/00 501/54 |
| 2014/0155246 A1* | 6/2014 | Annamalai | C03C 3/06 501/54 |
| 2015/0080206 A1* | 3/2015 | Duran | C03B 25/02 501/54 |
| 2015/0259239 A1* | 9/2015 | Annamalai | C03C 3/06 501/54 |
| 2016/0137545 A1 | 5/2016 | Annamalai | |
| 2016/0145147 A1 | 5/2016 | Annamalai et al. | |
| 2016/0168010 A1 | 6/2016 | Annamalai | |
| 2016/0236965 A1 | 8/2016 | Annamalai et al. | |
| 2016/0264447 A1 | 9/2016 | Oohs et al. | |

OTHER PUBLICATIONS

International Search Report and Written Opinion PCT/US2016/062121 dated Feb. 3, 2017.

U.S. Appl. No. 15/003,115—Annamalai et al. "Ultraloin Expansion Titania-Silica Glass" filed Jan. 21, 2016.

Agarwal et al., "A simple IR spectroscopic method for determining fictive temperature of silica glasses", Journal of Non-Crystalline Solids, 185 (1995), 191-198.

Carapella et al., "ULE® Glass for EUVL applications, a fictive temperature correlation", Journal of Non-Crystalline Solids, 367 (2013), 37-42.

* cited by examiner

DOPED ULTRA-LOW EXPANSION GLASS AND METHODS FOR ANNEALING THE SAME

This application claims the benefit of priority under 35 U.S.C. § 119 of U.S. Provisional Application Ser. No. 62/258,755 filed on Nov. 23, 2015 the content of which is relied upon and incorporated herein by reference in its entirety.

BACKGROUND

The disclosure is directed to doped, silica-titania ultra-low expansion ("ULE") glass, glass articles and methods for making the same.

Extreme Ultra-Violet Lithography ("EUVL") is an emerging/leading lithography technology for the 13 nm node and beyond for manufacturing Micro Processing Units ("MPU") and Dynamic Random Access Memory ("DRAM") chips. The EUVL scanners which are used to produce MPU, DRAM and other integrated chips have been produced in small numbers to demonstrate this technology. Projection optics systems, particularly reflective optics systems, are an important part of these scanners. Low thermal expansion glass, for example Corning® Incorporated ULE® glass, has been used for making the projection optics systems used in EUVL scanners. Advantages of a low thermal expansion glass such as ULE® Glass include: polishability to the required finish, coefficient of thermal expansion ("CTE") and expansivity control, and dimensional stability.

As the development of EUVL systems proceeds, the specifications are becoming more stringent for newer optics systems, particularly those employed in high-volume integrated chip and semiconductor device manufacturing. As a result, the specifications for the materials employed in these optics systems, including CTE and expansivity criteria, are becoming increasingly more difficult to achieve.

More particularly, the mirror substrates employed in the projection optics systems within EUVL scanners must meet stringent CTE requirements in order to maintain their intended surface shape upon temperature changes caused by normal operation cycles of the scanners. As the EUVL source power increases to meet the requirements of a high volume manufacturing system, the specifications for the projection optics mirror substrates are becoming even more stringent. Current glass compositions employed in these substrates have approached a rate of change of CTE with temperature (also known as "CTE slope" or "expansivity slope" with units of ppb/$K^2$) of about 1.35 ppb/$K^2$ at 20° C. However, newer specifications for mirror substrates are desired that would require CTE slope levels of less than 1.35 ppb/$K^2$, and for some applications CTE slope levels as low as, or even lower than, 0.6 ppb/$K^2$ at 20° C. will be required.

Accordingly, there is a need for ULE glass, and methods of making it, that can be employed in EUVL applications with low expansivity and reduced expansivity slope and, even more preferably, low expansivity and reduced expansivity slope with a high level of polishability.

SUMMARY

A doped silica-titania glass article is disclosed that includes a glass article having a glass composition comprising a silica-titania base glass containing titania at 7 to 14 wt. % and a balance of silica, and a dopant selected from the group consisting of (a) F at 0.7 to 1.5 wt. %, (b) $B_2O_3$ at 1.5 to 5 wt. %, (c) OH at 1000 to 3000 ppm, and (d) $B_2O_3$ at 0.5 to 2.5 wt. % and OH at 100 to 1400 ppm. The glass article has an expansivity slope of less than about 1.3 ppb/$K^2$ at 20° C. In certain aspects, the expansivity slope can be less than about 1.1 ppb/$K^2$ at 20° C., less than about 0.6 ppb/$K^2$ at 20° C., or, in some cases, less than about 0.4 ppb/$K^2$ at 20° C.

In some implementations of the doped silica-titania glass articles, the dopant is F at 0.7 to 1.5 wt. %, the expansivity slope is less than about 0.6 ppb/$K^2$ at 20° C. and OH is present in the glass composition at less than 10 ppm. In another implementation, the dopant is $B_2O_3$ at 1.5 to 5 wt. %, the expansivity slope is less than about 1.1 ppb/$K^2$ at 20° C. and OH is present in the glass composition at less than 100 ppm. In an additional implementation, the dopant is OH at 1000 to 3000 ppm, and the expansivity slope is less than about 1.3 ppb/$K^2$ at 20° C. Still further, another implementation of the doped-silica titania glass articles contains $B_2O_3$ and OH as the dopant, at 0.5 to 2.5 wt. % and 100 to 1400 ppm, respectively, and the expansivity slope is less than about 1.1 ppb/$K^2$ at 20° C.

Also disclosed is a method of annealing a doped silica-titania ("DST") glass body, the glass body comprising a silica-titania based glass composition containing titania at 7 to 14 wt. % and at least one additional dopant selected from the group consisting of F, B and OH. The method includes heating the glass body at or above the crystal melting temperature of the glass body for 30 minutes or longer; cooling the glass body from at or above the crystal melting temperature to a temperature below the strain point; and annealing the glass body after, or during, the step for cooling the glass body, the annealing conducted from an upper annealing temperature set at least about 50° C. below the crystallization onset temperature ("XOT") of the glass body down to a lower annealing temperature at a cooling rate from about 30° C./hour to about 0.01° C./hour. In some embodiments, the cooling rate may be from about 10° C./hour to about 0.01° C./hour, more preferably from about 3° C./hour to about 0.01° C./hour, and even more preferably from about 1° C./hour to about 0.01° C./hour. In certain embodiments, the XOT can be determined from prior-obtained high temperature x-ray diffraction ("HTXRD") data from the glass body. Further, the glass body exhibits an expansivity slope of less than about 1.3 ppb/$K^2$ at 20° C. after the annealing step of the method of annealing.

The glass body may be prepared by doping silica-titania soot with at least one dopant precursor selected from the group consisting of F-, B-, and OH-containing precursors. Suitable dopant precursors include, but are not limited to, $SiF_4$, $CF_4$, $C_2F_6$, ammonium pentaborate, boron oxide, boric acid, He with >0.1 atm of $PH_2O$, and others as understood by those with ordinary skill in the field. During or after the consolidation step the glass may be heated to above the crystal melting temperature of the glass body as the initial precursor to practicing the method of annealing. The DST glass body may further comprise at least one dopant precursor selected from the group consisting of F-, B-, and OH-containing precursors such that the doped glass body comprises: (a) F at 0.7 to 1.5 wt. %, (b) $B_2O_3$ at 1.5 to 5 wt. %, (c) OH at 1000 to 3000 ppm, or (d) $B_2O_3$ at 0.5 to 2.5 wt. % and OH at 100 to 1400 ppm.

The upper annealing temperature may be from about 60° C. greater than the strain point to about 20° C. less than the strain point.

According to a first embodiment of the method for annealing a DST glass body, the annealing is conducted after the step for cooling the doped glass body, and the step for cooling the doped glass body from at or above the crystal melting temperature is conducted at a cooling rate of at least 100° C./hour. The doped glass body may comprise F at 0.7 to 1.5 wt. % as a dopant and OH at less than 10 ppm, and exhibit an expansivity slope of less than about 0.6 ppb/K² at 20° C. after the annealing step.

According to a second embodiment of the method of annealing a DST glass body, the annealing is conducted during the step for cooling the doped glass body, and the step for cooling the doped glass body from at or above the crystal melting temperature is conducted at a cooling rate of at least 100° C./hour to the upper annealing temperature. The doped glass body may comprise F at 0.7 to 1.5 wt. % as a dopant and OH at less than 10 ppm, exhibit an expansivity slope of less than about 0.6 ppb/K² at 20° C. after the annealing step.

According to a third embodiment of the method of annealing a DST glass body, the step for cooling the doped glass body from at or above the crystal melting temperature to a temperature below the strain point of the glass body further includes the steps: cooling the doped glass body from at or above the crystal melting temperature at a cooling rate of 100° C./hour or greater down to an upper intermediate temperature above about 50° C. below the annealing point; and cooling the doped glass body from the upper intermediate temperature down to a lower intermediate temperature from about 20° C. greater than the strain point to about 250° C. less than the strain point at a cooling rate of about 20° C./hour to about 30° C./hour. In some preferred embodiments for implementing the third embodiment of the annealing method, the doped glass body may be comprised of $B_2O_3$ at 1.5 to 5 wt. % and OH at less than 100 ppm after the doping, and exhibit an expansivity slope of less than about 1.1 ppb/K² at 20° C. after the annealing step. According to another implementation of the third embodiment, the doped glass body may be comprised of OH at 1000 to 3000 ppm after the doping, and exhibit an expansivity slope of less than about 1.3 ppb/K² at 20° C. after the annealing step. Further, the doped glass body may be comprised of $B_2O_3$ at 0.5 to 2.5 wt. % and OH at 100 to 1400 ppm after the doping, and exhibit an expansivity slope of less than about 1.1 ppb/K² at 20° C. after the annealing step.

The annealing step in the third embodiment of the annealing method may be conducted after the step for cooling the doped glass body, and the step for cooling the doped glass body from at or above the crystal melting temperature to a temperature below the strain point further includes cooling the doped glass body from the lower intermediate temperature down to a temperature below the strain point (e.g., ambient temperature) at a cooling rate of 100° C./hour or greater. In another implementation of the third embodiment of the annealing method, the annealing step is conducted during the step of cooling the doped glass body, and the annealing further includes heating the doped glass body from the lower intermediate temperature to the upper annealing temperature.

In another variant of the third embodiment of the annealing method, the upper annealing temperature is from about 60° C. greater than the strain point to about 20° C. less than the strain point. Further, the crystallization onset temperature can be determined from prior-obtained HTXRD data from the doped glass body. In certain aspects, the lower annealing temperature can be set at about the strain point or below the strain point. Further, the annealing step can be conducted such that it includes one or more isothermal anneals at temperatures between the upper and lower annealing temperatures.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
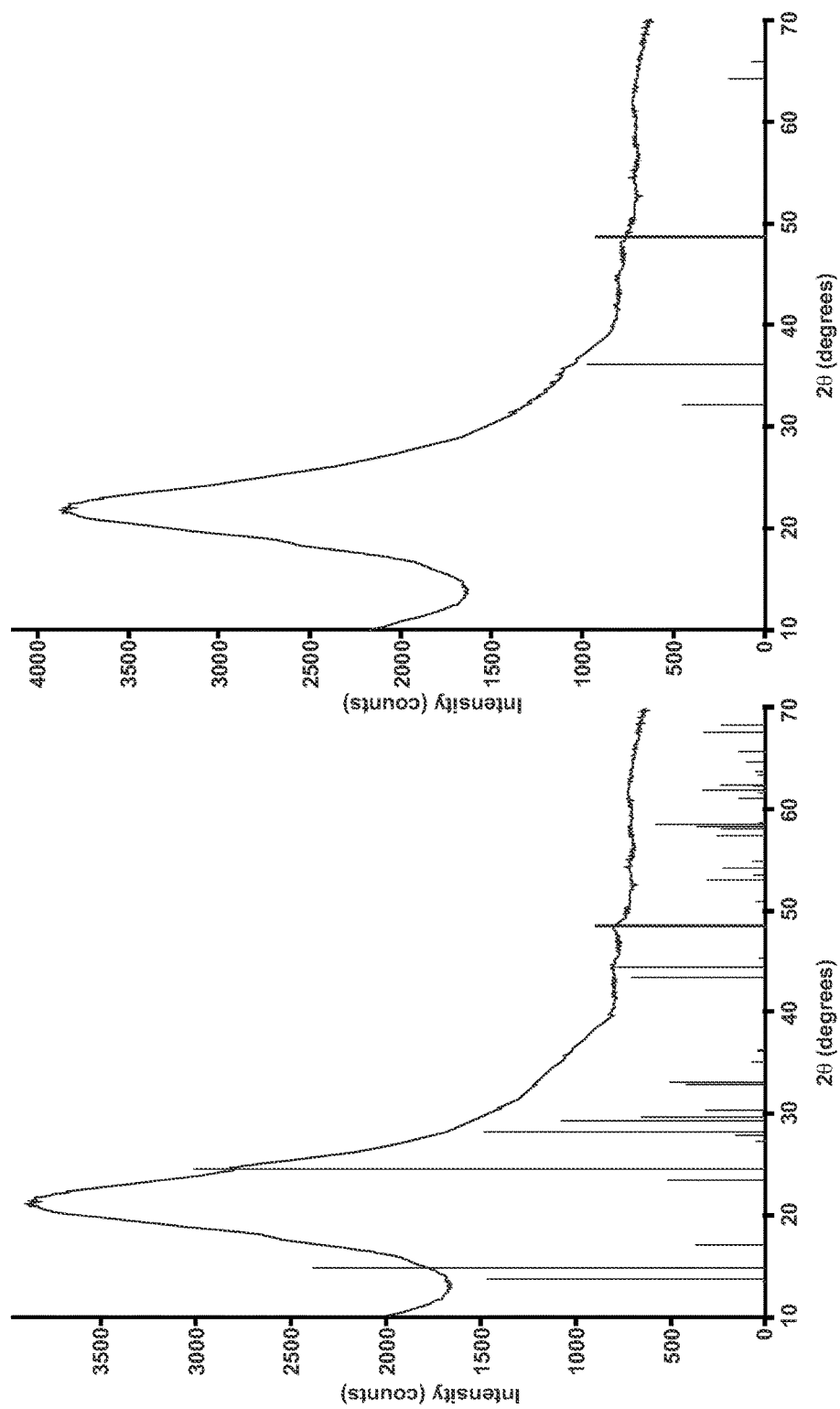
FIG. 1 includes two powder x-ray diffraction ("XRD") plots of intensity as a function of 2θ from boron doped titania-silica glass bodies according to an aspect of the disclosure—the left-hand XRD plot depicting a glass body after being subjected to a 1670° C. crystal melting temperature, cooling to room temperature and annealing at 950° C. for about 6 hours; and the right-hand XRD plot depicting a glass body after being subjected to a 1670° C. crystal melting temperature, cooling to an annealing temperature of 950° C., holding at 950° C. for about 6 hours and cooling to room temperature.

Reference will now be made in detail to the present preferred embodiments, examples of which are illustrated in the accompanying drawings. Whenever possible, the same reference numerals will be used throughout the drawings to refer to the same or like parts. It should be understood that the embodiments disclosed herein are merely examples, each incorporating certain benefits of the present disclosure.

Various modifications and alterations may be made to the following examples within the scope of the present disclosure, and aspects of different examples may be mixed in different ways to achieve yet further examples. Accordingly, the true scope of the disclosure is to be understood from the entirety of the present disclosure, in view of but not limited to the embodiments described herein.

Terms such as "horizontal," "vertical," "front," "back," etc., and the use of Cartesian Coordinates are for the sake of reference in the drawings and for ease of description and are not intended to be strictly limiting either in the description or in the claims as to an absolute orientation and/or direction.

As used herein, the "annealing point" is the temperature at which the viscosity of the DST glass or DST glass body is $10^{13}$ Poise.

As used herein, the "strain point" is the temperature at which the viscosity of the DST glass or DST glass body is $10^{14.5}$ Poise.

As used herein, the "upper annealing temperature" is an annealing temperature for the DST glass according to the disclosure that is set below the crystallization onset temperature for the DST glass. The "upper annealing temperature" can be set at least about 50° C. below the crystallization onset temperature for the DST glass and, preferably, from about +60° C. to −20° C. of the strain point for the DST glass.

As used herein, the "lower annealing temperature" is the lowest, controlled annealing temperature employed during the annealing of the DST glass. In a preferred aspect, the "lower annealing temperature" is set at about the strain point or below the strain point of the DST glass.

As used herein, the "crystal melting temperature" (or "CMT") is the lowest temperature at which titania crystals within a DST glass, DST glass body or other DST form will melt, dissolve or otherwise substantially disappear within the DST glass, body or form after an exposure of about 30 minutes to this temperature. For an undoped, silica-titania glass with 7.5 wt. % $TiO_2$, the CMT is about 1630° C.

As used herein, the "crystallization onset temperature" (or "XOT") is the temperature at which a fast-cooled DST glass (i.e., a glass that has been cooled at a rate of at least 100° C./hour from the crystal melting temperature to a temperature below the strain point of the glass) without an appreciable concentration of titania crystals (i.e., <0.1 wt. %) develops at least 0.1 wt. % titania crystals after an exposure at this temperature for about 6 hours in flowing dry air. The XOT can be determined for a given DST glass composition using HTXRD techniques as will be discussed further below with respect to FIG. 2. Further, the actual, lowest temperature associated with the onset of crystallization (i.e., upon exposure for about 6 hours in dry air at the specified temperature) for a given DST glass may be lower than the XOT, as used herein, in view of current equipment and measurement capability limitations. In view of the teachings herein, those with ordinary skill in the art will appreciate how to modify the methods of the disclosure to account for any future, improved capabilities for measuring the onset of crystallization in the DST glasses of the disclosure. In addition, those with ordinary skill in the art will understand that care must be taken in maintaining the cleanliness of the XOT testing such that the crystallization, when observed, is internally nucleated crystals and not surface-driven nucleation. Internal nucleation is characterized by titania crystals only without crystobalite formation. Examples of titania crystals include monoclinic, anatase and/or rutile crystals. The presence of crystobalite indicates surface-driven crystallization and invalidates a particular XOT test, necessitating further improvements in system cleanliness upon retesting.

As used herein, the "upper intermediate temperature" is employed in certain methods of annealing the DST glasses of the disclosure. In particular, the "upper intermediate temperature" is set to a temperature above 50° C. below the anneal point for the DST glass according to the disclosure.

As used herein, the "lower intermediate temperature" is employed in certain methods of annealing the DST glasses of the disclosure. In particular, the "lower intermediate temperature" is set from about 20° C. greater than the strain point to about 250° C. less than the strain point for the DST glass according to the disclosure.

As used herein, the term "base glass" refers to an undoped titania-silica glass. As such, concentrations given for titania and silica are with respect to an undoped glass or "base glass." Further, concentrations given for any dopants are with respect to the glass, as-doped ("doped glass"). As understood by those with ordinary skill in the field, the silica and titania ratio remain the same in undoped glass ("base glass") and doped glass, but the absolute weight percents of titania and silica will be lower in the doped glass than the undoped glass.

The present disclosure is directed to doped silica-titania glass articles ("DST glass"), having an expansivity (or CTE) slope that is significantly improved over conventional silica-titania systems, including some silica-titania systems with an expansivity slope of about 1.6 ppb/$K^2$ at 20° C.

One approach to lowering the expansivity slope of a silica-titania glass is to anneal it as long as is practicable. "Annealing" is a thermal process employed to relieve internal stresses in a particular glass composition and fix the structure of the glass. Typically, such glasses are annealed by cooling the glass with a moderate to a slow cooling rate (e.g., from about 30° C./hour to about 0.01° C./hour) from temperatures at or above the annealing point of the glass to a temperature at or below the strain point of the glass. The annealing process sets a final fictive temperature ($T_f$) of the glass at the temperature where the glass relaxes too slowly to match the cooling rate of the furnace. Alternatively, annealing can include, or can be completed by, holding the glass at a given temperature near the strain point of the glass for a long period of time (e.g., annealing durations of weeks or months). In this case, the final fictive temperature ($T_f$) for the glass will approach to the annealing temperature, set near the strain point of the glass. Note that $T_f$ is the temperature at which the liquid structure of the glass is frozen (or fixed) upon cooling down; or, equivalently, the extrapolated glass and supercooled liquid lines of a glass density intersect. Further, the structure of the glass is considered to be that of the equilibrium liquid at the $T_f$.

Another approach to lowering the expansivity slope of a silica-titania glass is to add one or more compatible dopants to the glass during processing. More preferably, the expansivity slope of a silica-titania is improved by adding one or more dopants and annealing the resulting, doped silica-titania ("DST") glass as long as practicable. In general, lowering the $T_f$ for the DST glass by annealing will also reduce its expansivity slope. However, as dopants are added to the silica-titania glass, the glass can become less viscous and may grow titania crystals during annealing, especially long annealing steps, depending on the particular glass composition. These crystals can greatly increase the CTE of the glass (and also the expansivity slope of the glass, in some cases) to the point where it is unusable for many ULE applications. More particularly, this problem may exist when the annealing point and/or the strain point are close in value to the XOT of the particular DST glass composition.

Accordingly, the disclosure outlines DST glass articles that contain F, $B_2O_3$ and/or OH as dopants. For those DST glass articles containing F and/or $B_2O_3$ as dopants, some trace amounts of OH can be present in these articles. When a dopant is added to the silica-titania glass to make a low expansivity slope glass according to this disclosure, the composition of the resulting glass is given as wt. % or ppm (by weight) of the added dopant. Any one or a combination of these dopants can reduce the CTE slope of the glass article having a DST composition. Further, the disclosure details heat treatment processes that are tailored to reduce the $T_f$ for these DST glasses as low as possible without the formation of titania crystals. As such, DST glasses subjected to the processes in the disclosure can exhibit a CTE close to zero combined with very low expansivity slopes (e.g., less than about 1.3 ppb/K$^2$ at 20° C.). Indeed, the preferred DST glasses with relatively higher dopant levels have a tendency to crystallize if not carefully managed during annealing. Preferred DST compositions for the annealing methods of the disclosure exhibit XOT values of less than 1050° C., preferably less than 1000° C. and more preferably less than 950° C.

In addition, when using the DST glass disclosed herein, the improvement in the expansivity slope of the glass from doping can exceed the improvements that are possible by adjustment of the annealing cycle alone without doping. Accordingly, faster annealing cycles for the DST glasses herein can be used in some aspects of this disclosure which greatly reduces the manufacturing costs associated with the products employing these glasses. This is accomplished via a combination of both structural and compositional changes to the DST glasses.

According to this disclosure, the base glass constituent of the DST glass is a silica-titania glass. The titania (i.e., $TiO_2$) is present in the glass at about 7 to about 14 wt. %. Alternatively, the titania may be present in the DST glass at 7 wt. %, 8 wt. %, 9 wt. %, 10 wt. %, 11 wt. %, 12 wt. %, 13 wt. %, or about 14 wt. %, along with all values therebetween.

In conventional binary silica-titania glass (i.e., undoped, silica-titania), the titania becomes metastable once its concentration exceed 12 wt. %. However, the addition of F, $B_2O_3$ and/or OH as dopants to silica-titania glass can move the metastable equilibrium of the glass to lower titania concentrations. As a result, titania in DST glass systems can crystallize at lower temperatures and times than are typically employed to anneal conventional silica-titania, undoped glass. Without being bound by theory, the formation of titania crystals in a DST glass can occur in a two-step process. First, nuclei must form. Second, additional material must diffuse to the existing nuclei and combine with it to grow the nuclei into a stable, titania crystal. In the first step, nuclei can form in the glass within a range of temperatures if the glass is given sufficient time at these temperatures. The time needed is temperature and composition dependent. The nucleation temperature range is also composition dependent. The nucleation temperature range is generally lower than the temperature range associated with crystal growth (i.e. the second step), but is likely to partially overlap the crystal growth range. In the second step, the crystal growth occurs over a range of temperatures at which existing nuclei can be enlarged, if given sufficient time at these temperatures. The time needed is temperature and composition dependent. The crystal growth temperature range is also composition dependent, is generally higher than the nucleation temperature range, and partially overlaps the nucleation temperature range.

As it relates to aspects of the disclosure, the development of titania crystals in DST glass can lead to an undesirable increase in CTE. The reason is that crystalline titania possesses a much higher CTE than the CTE of the balance of the silica-based glass. Moreover, as the titania crystallizes, the CTE of the balance of the silica-based glass also increases due to the lowering of the titania content in the glass. As a result, crystallization of titania in DST glass can lead to a non-linear increase in CTE. Moreover, the presence of titania crystallites can interfere with polishing of glass articles having a DST composition making it more difficult to achieve required mid-spatial frequency roughness ("MSFR") levels of the application employing the DST glass article. Accordingly, aspects of the disclosure relate to DST glass having particular dopant concentrations and a thermal processing profile tailored to the composition.

According to one embodiment, a doped silica-titania glass article has a glass composition comprising a silica-titania base glass containing titania at 7 to 14 wt. % and a balance of silica, and a dopant selected from the group consisting of (a) F at 0.7 to 1.5 wt. %, (b) $B_2O_3$ at 1.5 to 5 wt. %, (c) OH at 1000 to 3000 ppm, and (d) $B_2O_3$ at 0.5 to 2.5 wt. % and OH at 100 to 1400 ppm. Such a glass article can exhibit an expansivity slope of less than about 1.3 ppb/K$^2$ at 20° C. In certain aspects of these DST glass articles, the expansivity slope can be less than about 1.1 ppb/K$^2$ at 20° C., less than about 0.6 ppb/K$^2$ at 20° C., or, in some cases, less than about 0.4 ppb/K$^2$ at 20° C.

In some implementations of the DST articles of the disclosure, the dopant is F at 0.7 to 1.5 wt. %, the expansivity slope is less than about 0.6 ppb/K$^2$ at 20° C. and OH is present in the glass composition at less than 10 ppm (e.g., as an impurity, by-product of the processing employed to create the DST glass, or from another source). In another implementation, the dopant is $B_2O_3$ at 1.5 to 5 wt. %, the expansivity slope is less than about 1.1 ppb/K$^2$ at 20° C. and OH is present in the glass composition at less than 100 ppm (e.g., as an impurity, processing by-product, etc.). In an additional implementation, the dopant is OH at 1000 to 3000 ppm, and the expansivity slope is less than about 1.3 ppb/K$^2$ at 20° C. Still further, another implementation of the doped-silica titania glass articles contains $B_2O_3$ and OH as the dopant, at 0.5 to 2.5 wt. % and 100 to 1400 ppm, respectively, and the expansivity slope is less than about 1.1 ppb/K$^2$ at 20° C.

According to some embodiments of the disclosure, the DST glass does not contain OH as an intentional dopant. For example, the DST glass can be produced according to certain processing conditions to ensure that its OH levels are particularly low. Accordingly, certain aspects of the DST glass in this disclosure can contain an OH concentration of less than 100 ppm. In another embodiment, the OH concentration is less than 50 ppm. In a further embodiment, the OH concentration is less than 30 ppm. In an additional embodiment, the OH concentration is less than 20 ppm.

Structurally, the annealing cycle of the DST glass is controlled to yield the desired glass structure(s). In the context of the DST glass articles of the disclosure, the combination of annealing and the controlled introduction of particular concentrations of one or two dopants (e.g., F, $B_2O_3$, and/or OH) leads to a significant expansivity slope reduction relative to conventional undoped silica-titania. In one embodiment, the DST glass has an expansivity slope of less than 1.3 ppb/K$^2$. In another aspect, the DST glass has an expansivity slope at 20° C. of less than 1.2 ppb/K$^2$, less than 1.1 ppb/K$^2$, less than 1.0 ppb/K$^2$, less than 0.9 ppb/K$^2$, less than 0.8 ppb/K$^2$, less than 0.7 ppb/K$^2$, less than 0.6 ppb/K$^2$, less than ppb/K$^2$, or even as less than 0.4 ppb/K$^2$.

Additionally, the annealing cycle of the DST glass articles of the disclosure can be controlled in such a manner to yield high degrees of homogeneity in the fictive temperature, $T_f$, of the DST glass. This aspect can be particularly important due to the presence of one or two dopants (e.g., F, $B_2O_3$, and OH) in the DST glass with non-uniform concentrations. Further, the fictive temperature homogeneity of the DST glass can benefit from annealing given the high diffusivity of the dopants employed according to aspects of the disclosure.

Halogen dopants can especially affect the fictive temperature and any non-uniformity in their distribution could cause large variations in properties, rendering the DST glass non-usable for certain applications. In one aspect, the DST glass has a fictive temperature, $T_f$, of less than 875° C. In another embodiment, the DST glass has a fictive temperature of less than 825° C. In another embodiment, the DST glass has a fictive temperature of less than 775° C. Still further, aspects of this disclosure include DST glass with a fictive temperature of less than 750° C. or, in some cases, less than 725° C.

The DST glass articles disclosed herein are generally not process limited. That is, the DST glass, and glass articles employing the DST glass, can be made by different manufacturing processes, for example, sol-gel, soot blank, soot pressing, outside vapor deposition, the direct process, the indirect process, plasma process and other processes known in the art. Nevertheless, it should also be understood that the expansivity levels exhibited by the DST glass articles of the disclosure can be sensitive to processing history, particularly the annealing steps employed during the method of making these articles.

The DST glass has two crossover temperatures, $T_{ZC}$, (i.e., the temperatures at which the CTE of the glass is zero) within the normal operational range for the glass when used in lithographic processes (including processes using 13 nm wavelength radiation) and other applications associated with ULE glass and Corning® ULE® glass. In one aspect of the disclosure, the two $T_{ZC}$ values are believed to be in the range of 0° C. to 150° C. In another aspect, the two $T_{ZC}$ values are expected to be in the range of 0° C. to 100° C. In another embodiment, the two $T_{ZC}$ values are expected to be in the range of 20° C. to 100° C. In a further embodiment, the two $T_{ZC}$ values are expected to be in the range of 20° C. to 80° C. In another embodiment, the two $T_{ZC}$ values are expected to be in the range of 10° C. to 60° C., 20° C. to 60° C., or even 10 to 40° C. In an additional embodiment, the DST glass is expected to possess a Tzc in the range of 0° C. to 100° C. in combination with an expansivity slope which substantially equals zero within this temperature range.

The DST glasses described herein are expected to have a strain point of less than 900° C., more preferably less than 850° C., even more preferably less than 810° C. The DST glass of this disclosure has a viscosity that is significantly reduced over that of conventional binary silica-titania glass systems. For example, a conventional binary silica-titania glass (e.g., with about 7.5 wt. % $TiO_2$ and 92.5 wt. % $SiO_2$) can exhibit an annealing point of 1001° C. and a strain point of 892° C., whereas the DST glass of the present disclosure may exhibit anneal and strain points of 885° C. and 770° C., respectively.

The DST glass, as doped with F, $B_2O_3$, and/or OH, according to this disclosure can exhibit a high homogeneity of fictive temperature, Tzc and CTE. In one embodiment, the $T_f$ of the DST glass varies less than ±10° C. within an entire article. In another embodiment, the $T_f$ variation of the DST glass is less than ±5° C. within an entire article. In a further embodiment, the $T_f$ variation of the DST glass is less than ±2° C. within an entire article. In one embodiment, the Tzc variation of the DST glass is less than ±5° C. within an entire article. In another embodiment, the Tzc variation of the DST glass is less than ±3° C. within an entire article. In an additional embodiment, the Tzc variation of the DST glass is less than ±2° C. within an entire article. These Tzc and $T_f$ variation levels are calculated based on measurements made in a volume of DST glass material measuring 2 mm×2 mm×2 mm and averaged over that volume. In these embodiments, the variation in these average $T_f$ and Tzc values within the entire article satisfy the foregoing limits. It should also be noted that these homogeneity levels require both good control of composition as well as tight control of the annealing process.

In one embodiment, an article made from the DST glass has an expected MSFR of less than 0.2 nm rms. In another embodiment, the MSFR of the article employing the DST glass is expected to be less than 0.15 nm rms. In a further embodiment, the MSFR of the article employing the DST glass is expected to be less than 0.12 nm rms or, in some cases, less than 0.10 nm rms.

In another embodiment of the DST glass, it is believed that the peak CTE ("$CTE_{max}$") within the two crossover temperatures does not exceed 30 ppb/K and has a slope of about 0 ppb/K$^2$ within the two crossover temperatures. In one embodiment, peak CTE of the DST glass within the two crossover temperatures should not exceed 20 ppb/K. In a further embodiment, it is expected that the peak CTE of the DST glass within the two crossover temperatures is less than 15 ppb/K. In an additional embodiment, it is expected that the peak CTE of the DST glass within the two crossover temperatures is less than 10 ppb/K. In a further embodiment, it is expected that the peak CTE of the DST glass within the two crossover temperatures is less than 8 ppb/K.

According to some embodiments, the DST glass can be fabricated with a process that involves a step of heating the material to at or above the crystal melting temperature (e.g., above 1550° C.) for at least 30 minutes, preferably more than 1 hour, or more than 5 hours in some cases. In general, the heating of the glass material to at or above the crystal melting temperature is conducted subsequent to consolidation and cooling of the glass to room temperature. As such, the step of heating the material to at or above the crystal melting temperature is performed to melt titania crystallites that may form in prior process steps, e.g., a consolidation step. Preferably, the material is heated for at least 30 minutes, preferably more than 1 hour, or more than 5 hours to at or above 1600° C., above 1650° C. or even greater than 1700° C. in some aspects. These high-temperature heating steps can be necessary in the process of making the DST glass when any crystals, such as $TiO_2$ crystals, are present within the glass at measureable concentrations. Temperatures at or above 1550° C. can melt these crystals within the DST glass. The presence of crystals can usually be detected with the human eye if opacity is present or by powder x-ray diffraction ("XRD"), scanning electron microscopy ("SEM") and/or optical microscopy. These analytical techniques are expected to allow measurements of the presence of crystals at levels of less than approximately 0.1 vol. %.

Once the crystals are melted via the foregoing high-temperature step, the DST glass should be subjected to an annealing step. This annealing step can be conducted during or after the step of cooling the DST glass from at or above the crystal melting temperature to a temperature below the strain point of the DST glass (e.g., room temperature). Without being bound by theory, the annealing of the DST glass has at least two purposes: (1) to obtain a lower $T_f$ in the glass; (2) to minimize birefringence in the glass caused by non-uniform cooling; and (3) to lower its expansivity slope. It is also generally understood in the art that annealing serves to reduce the residual stresses that may exist in the glass at ambient temperatures.

According to a first embodiment of a method of annealing a DST glass body, the annealing of the DST glass can be conducted in an annealing step subsequent to the step of cooling the glass from at or above the crystal melting temperature of the DST glass down to a temperature below the strain point of the DST glass (e.g., ambient or room temperature). Preferably, the glass body comprising the DST glass is cooled from at or above the crystal melting temperature at rate of 100° C./hour or greater. Once the DST glass body has been cooled to a temperature below the strain point, the glass body is then reheated for purposes of annealing the glass to an upper annealing temperature below a XOT associated with the DST glass. In a second embodiment, the annealing step is conducted during the step of cooling the DST glass, and the step for cooling the DST glass from at or above the crystal melting temperature of the DST glass is conducted at a cooling rate of 100° C./hour or greater to the upper annealing temperature, again set below a XOT for the DST glass.

In certain aspects, the annealing is initiated at an upper annealing temperature of about 900° C., 850° C., 800° C. and all values therebetween. The annealing itself can include a hold from 0 to about 5 hours at the upper annealing temperature and cooling to a lower annealing temperature at a rate of about 0.01 to about 30° C./hour. In some embodiments, the cooling rate may be from about 10° C./hour to about 0.01° C./hour, more preferably from about 3° C./hour to about 0.01° C./hour, and even more preferably from about 1° C./hour to about 0.01° C./hour. According to certain implementations, the DST glass body is cooled from the upper annealing temperature to a lower annealing temperature set at about the strain point or below the strain point of the DST glass at a cooling rate of about 0.01 to about 30° C./hour. In certain aspects, the annealing can also include one or more isothermal holds between the upper annealing temperature and the lower annealing temperature. For example, these isothermal holds can be set at various times and temperatures as understood by those with ordinary skill to ensure temperature uniformity within the DST glass during annealing in view of its thermal mass, the thermal mass of the furnace, furnace heating capabilities, etc. Finally, the DST glass body is cooled to a temperature below the strain point of the DST glass body, e.g., room temperature, typically at a furnace cooling rate (i.e., the approximate cooling rate of the glass body within a furnace having all of its heating elements deactivated).

The initial, consolidated DST glass (i.e., prior to heating at or above the crystal melting temperature and annealing steps) can, in certain implementations, be formed by depositing silica-titania soot particles using a silica precursor and a titania precursor, the particles containing 7 to 14 wt. % titania and a balance of silica; forming a soot blank from the soot particles; and consolidating the soot blank in a furnace, wherein the consolidation step comprises: (a) heating the soot blank to more than 1200° C. in a flowing inert atmosphere, and (b) consolidating the blank at a peak temperature of more than 1250° C. under a flowing consolidation gas comprising helium- and oxygen-containing gases to form a consolidated blank. The use of an oxygen component in the consolidation gas ensures that the amount of titanium in the glass in an oxidation state of $Ti^{3+}$ is minimized within the glass, as this state can lead to brown discoloration in the glass. The step for preparing the silica-titania soot particles further comprises doping the particles with at least one dopant precursor selected from the group consisting of F-, B-, and OH-containing precursors. Suitable dopant precursors include, but are not limited to, $SiF_4$, $CF_4$, $C_2F_6$, ammonium pentaborate, boron oxide, boric acid, He with >0.1 atm of $PH_2O$, and others as understood by those with ordinary skill in the field. The consolidated DST glass may then be cooled to room temperature or to a relatively low temperature suitable for handling. As desired, the consolidated DST glass blank may then be sectioned subsequent to consolidation and prior to being subjected to melting at a crystal melting temperature and annealing. Sectioning into smaller glass product forms will facilitate and speed up the subsequent crystal melting and annealing process steps, owing to the reduction in thermal mass associated with sectioned DST glass product forms. After the DST glass has been consolidated, or consolidated and sectioned, the resulting DST glass product form is heated to at or above the crystal melting temperature, at least 1550° C. for 30 minutes or longer in preferred aspects. In certain implementations, the consolidated DST glass can be heated directly to at or above the crystal melting temperature after consolidation without cooling, particularly in situations in which the DST glass body is not sectioned prior to subsequent heating to at or above the crystal melting temperature and/or annealing.

Referring again to the first embodiment of a method of annealing a DST glass body, the DST glass is cooled after being subjected to heating at or above the crystal melting temperature. For example, the DST glass can be cooled from at or above the crystal melting temperature to room temperature (or a suitable, higher temperature below the strain point of the DST glass) at a cooling rate of 100° C./hour or greater. In the second embodiment of the method, the annealing step is conducted during the step of cooling the DST glass, and the step for cooling the DST glass from at or above the crystal melting temperature is also conducted at a cooling rate of 100° C./hour or greater to the upper annealing temperature. After reaching the upper annealing temperature, e.g., 900° C., 875° C. or 850° C., etc., through heating from a suitable temperature below the strain point of the DST glass (e.g., as in the first embodiment) or cooling from at or above the crystal melting temperature (e.g., as in the second embodiment), the DST glass body can be held at the upper annealing temperature for about 0 to 5 hours (preferably, about 1 hour) and then cooled at about 0.01 to about 30° C./hour to room temperature, or to a lower annealing temperature, e.g., 650° C. In the latter aspect of the method employing a lower annealing temperature, the DST glass can be cooled at a furnace cooling rate from the lower annealing temperature to room temperature or a suitable temperature below the strain point of the DST glass. After completion of the annealing according to the first or second embodiments, the resulting DST glass body, product form or the like can exhibit an expansivity slope of less than about 1.3 $ppb/K^2$ at 20° C. In addition, the resulting DST glass can exhibit a reduced expansivity.

Further, in another embodiment of the method of annealing a DST glass body, including the first and second embodiments, the step for preparing the soot particles further comprises, prior to consolidation of the soot particles, doping the particles with at least one dopant precursor selected from the group consisting of F-, B-, and OH-containing precursors such that the particles include: (a) F at 0.7 to 1.5 wt. %, (b) $B_2O_3$ at 1.5 to 5 wt. %, (c) OH at 1000 to 3000 ppm, or (d) $B_2O_3$ at 0.5 to 2.5 wt. % and OH at 100 to 1400 ppm after completion of the doping. In some embodiments, the soot particles can comprise F at 0.7 to 1.5 wt. % and OH at less than 10 ppm after the doping, and the glass body has an expansivity slope of less than about 0.6 $ppb/K^2$ at 20° C. after the annealing step. Accordingly, the method of annealing can be particularly advantageous in resulting in DST glass bodies having a halogen dopant, such as F, with substantially no titania in crystalline form and low expansivity slope levels.

Without being bound by theory, it is believed that the first and second embodiments of the method of annealing a DST glass body can be particularly well-suited to obtaining low expansivity slope values for DST glass compositions that exhibit a fictive temperature at or below the crystallization onset temperature after being exposed to the CMT for a time sufficient to dissolve any titania crystallites in the body. Put another way, these methods can be employed to achieve sufficient annealing to achieve a low expansivity slope in certain DST glass compositions with relatively low titania levels (e.g., <10 wt. % TiO$_2$), including those doped with fluorine, boron (e.g., <2 wt. % B$_2$O$_3$), or OH.

In another implementation of the first and second embodiments of the annealing method, the upper annealing temperature can be set based on prior experimental determinations of the crystallization onset temperature for a particular composition of the DST glass body, consolidated blank or the like. Under this approach, one or more samples of the DST glass body are processed equally (i.e., with the same consolidation temperatures, cooling rates, etc.) through the steps of the method including the step of heating the glass body to at or above the crystal melting temperature, e.g., above 1550° C., and cooling the body down to room temperature (or a suitable temperature below the strain point of the DST glass). At this point, the sample(s) are subjected to in situ HTXRD analytical testing by heating the glass to various potential upper annealing temperatures and annealing durations (e.g., as an isothermal hold at the upper annealing temperature). X-ray diffraction data is then gathered from the samples as they are being subjected to the potential annealing temperatures and times. After the x-ray diffraction data is gathered for a given DST composition at various potential annealing temperatures and times, the results can be evaluated to determine the lowest potential upper annealing temperature and time demonstrating the onset of titania crystallization (e.g., an increase in intensity for 2θ angles that correspond to the crystal structure for titania in the DST glass body system). Based on this data, one can set the maximum upper annealing temperatures and/or annealing duration that does not result in any, or substantial amounts of, titania crystallization (e.g., <0.1 wt. % titania crystals).

According to a third embodiment of the method of annealing a DST glass body, annealing of the DST glass can be conducted after cooling the DST glass between an upper and lower intermediate temperature for the DST glass. In particular, the cooling of the DST glass from at or above the crystal melting temperature for the DST glass can include: cooling the doped glass body from at or above the crystal melting temperature at a cooling rate of 100° C./hour or greater down to an upper intermediate temperature within ± about 50° C. of the annealing point; and cooling the doped glass body from the upper intermediate temperature down to a lower intermediate temperature from about 20° C. greater than the strain point to about 250° C. less than the strain point at a cooling rate of about 20° C./hour to about 30° C./hour. This controlled cooling is performed on the DST glass to obtain a lower $T_f$ in the glass by using a fairly fast cool down from at or above the crystal melting temperature to a temperature range in which the fictive temperature of the glass can be reduced while, at the same time, limiting exposure of the DST glass to titania crystal growth conditions, particularly the development of crystalline titania nuclei. In view of this controlled cooling which can lower the $T_f$ of the DST glass, the subsequent annealing step can be performed at a relatively lower upper annealing temperature, specifically to avoid exposure of the DST glass to titania crystal growth conditions. For example, the controlled cooling of the third embodiment can be conducted such that the DST glass body is cooled from at or above the crystal melting temperature at rate of 100° C./hour or greater to an upper intermediate temperature within ±50° C. of the anneal point (e.g., of about 1050° C. or less), and then cooled to a lower intermediate temperature from about 20° C. greater than the strain point to about 250° C. less than the strain point at a cooling rate from about 20 to about 30° C./hour.

Referring again to the third embodiment of the method of annealing a DST glass, the DST glass body is then cooled to room temperature (or a suitable temperature below the strain point of the DST glass) at a furnace cooling rate (e.g., a natural cooling rate after power to the furnace has been removed), and then reheated up to the upper annealing temperature, set below the XOT for the particular DST glass composition, to begin the annealing step. In certain embodiments, the furnace cooling rate is greater than 100° C./hour. In an alternative implementation of the third embodiment of the method of annealing, the DST glass body is reheated directly to the upper annealing temperature after reaching the lower intermediate temperature. In another implementation of the third embodiment of the method of annealing, the upper annealing temperature is about 50° C. less than the XOT for the DST glass body. Preferably, the upper annealing temperature is also from about 60° C. greater than the strain point to about 20° C. less than the strain point for the particular DST glass.

Once the DST glass body has reached the upper annealing temperature, it can optionally be subjected to further time at the upper annealing temperature (e.g., through an isothermal hold from about 0 to 5 hours) and then annealed by controlled cooling to the lower annealing temperature. The annealing can also include isothermal holds between the upper and lower annealing temperatures. For example, the glass body can be reheated to a maximum upper annealing temperature of 900° C. for a predetermined duration, with the duration and temperature designated as part of the "annealing step" for the DST glass. In certain aspects of the disclosure, this annealing step can be conducted at a maximum upper annealing temperature of 850° C. The annealing at the upper annealing temperature can be conducted from about 0 to about 5 hours. According to certain implementations of the annealing step in this third embodiment, the DST glass body is cooled from the maximum upper annealing temperature to a lower annealing temperature of about 550° C. to about 650° C. at a rate from about 0.1 to about 3° C./hour. In certain aspects, the annealing step can also include one or more isothermal holds between the maximum upper annealing temperature (e.g., 900° C.) and the lower annealing temperature (e.g., 650° C.). Finally, the glass body is cooled to room temperature, typically at a furnace cooling rate, or to a suitable temperature below the strain point of the DST glass.

According to an exemplary implementation of the third embodiment of the annealing method, a method of annealing a DST glass body is provided that may include processing steps for the DST glass body prior to the steps for heating the body at or above the crystal melting temperature and the controlled cooling and annealing steps. For example, the method can include the steps: preparing silica-titania soot particles using a silica precursor and a titania precursor, the particles containing 7 to 14 wt. % titania and a balance of silica; forming a soot blank from the soot particles; and consolidating the soot blank in a furnace, wherein the consolidation step comprises: (a) heating the soot blank to more than 1200° C. in a flowing inert atmosphere, and (b) consolidating the blank at a peak temperature of more than 1250° C. under a flowing consolidation gas comprising helium- and oxygen-containing gases to form a consolidated blank. The method may, in some aspects, further include a step of sectioning the consolidated blank into at least one glass body (e.g., comparable to the approaches outlined earlier in connection with the first and second embodiments). In addition, the step for preparing the silica-titania soot particles in the third embodiment can also comprise doping the particles with at least one dopant precursor selected from the group consisting of B-, F- and OH-containing precursors. In one embodiment, the step for preparing the soot particles can include doping the particles with at least one dopant precursor selected from the group consisting of F-, B-, and OH-containing precursors such that the doped particles include: (a) F at 0.7 to 1.5 wt. %, (b) $B_2O_3$ at 1.5 to 5 wt. %, (c) OH at 1000 to 3000 ppm, or (d) $B_2O_3$ at 0.5 to 2.5 wt. % and OH at 100 to 1400 ppm.

In an implementation of the third embodiment, the consolidated DST glass body (e.g., as a sectioned glass product formed from room temperature, as a glass body immediately after consolidation, etc.) is heated to at or above the crystal melting temperature (e.g., heating to at least 1550° C.) for 30 minutes or longer. As noted earlier, the DST glass body can also be subjected to even higher crystal melting temperatures and longer durations at these temperatures to accomplish melting of titania crystallites that form during consolidation. Further, the DST glass body can then be cooled from at or above the crystal melting temperature to room temperature (or a suitable temperature below the strain point of the DST glass), with a controlled cooling conducted during this cooling phase. For example, the DST glass body can be cooled relatively quickly from at or above the crystal melting temperature at a cooling rate of 100° C./hour or greater down to an upper intermediate temperature within ± about 50° C. of the annealing point. The DST glass body can then be cooled from the upper intermediate temperature down to a lower intermediate temperature from about 20° C. greater than the strain point to about 250° C. less than the strain point at a cooling rate of about 20° C./hour to about 30° C./hour. In some aspects, as noted earlier, this controlled cooling reduces the fictive temperature of the DST glass without an appreciable increase in the amount of crystalline titania and/or titania nuclei.

This implementation of the third embodiment further includes an annealing step, which can include reheating the DST glass body after it has been subjected to a controlled cooling and further cooling to room temperature (or a suitable temperature below the strain point of the DST glass). For example, the reheating can be conducted to an upper annealing temperature (e.g., 850° C.) set at least 50° C. less than the crystallization onset temperature for the DST glass, e.g., as obtained through the HTXRD techniques outlined earlier. The annealing step can include an isothermal hold at the upper annealing temperature from about 0 to about 5 hours and, as noted earlier. Further, the annealing includes cooling the glass body from the upper annealing temperature to a lower annealing temperature (e.g., at about the strain point or below the strain point of the DST glass, about 550° C. to about 650° C. in some cases) at a rate from about 0.01 to about 30° C./hour. In some embodiments, the cooling rate may be from about 10° C./hour to about 0.01° C./hour, more preferably from about 3° C./hour to about 0.01° C./hour, and even more preferably from about 1° C./hour to about 0.01° C./hour. Also, as noted earlier, the annealing can include one or more isothermal holds between the upper and lower annealing temperatures. Finally, the DST glass body is cooled to room temperature, typically at a furnace cooling rate, or a suitable temperature below the strain point of the DST glass body.

Ultimately, the DST glass body can exhibit an expansivity slope of less than about 1.3 ppb/$K^2$ at 20° C. after being subjected to the third embodiment of the annealing method outlined in the disclosure. In certain aspects, the soot particles comprise $B_2O_3$ at 1.5 to 5 wt. % and OH at less than 100 ppm after the doping, and the consolidated DST glass body formed from the soot particles and subjected to the third embodiment can exhibit an expansivity slope of less than about 1.1 ppb/$K^2$ at 20° C. According to another implementation, the soot particles comprise OH at 1000 to 3000 ppm after the doping, and the consolidated DST glass body formed from the soot particles and subjected to the third embodiment of the annealing method can exhibit an expansivity slope of less than about 1.3 ppb/$K^2$ at 20° C. In another exemplary implementation of the third embodiment of the annealing method, the soot particles comprise $B_2O_3$ at 0.5 to 2.5 wt. % and OH at 100 to 1400 ppm, after the doping, and the DST glass body formed from the particles and subjected to the third embodiment of the annealing method can exhibit an expansivity slope of less than about 1.1 ppb/$K^2$ at 20° C. Accordingly, the third embodiment can be particularly advantageous in annealing DST glass bodies having at least one of $B_2O_3$ and/or OH dopants. Further, the third embodiment is well-suited to achieve a very low expansivity slope in certain DST glass compositions with higher titania levels (e.g., >10 wt. % $TiO_2$), including those doped with fluorine, boron (e.g., >2 wt. % $B_2O_3$), OH, or $B_2O_3$ and OH.

In another implementation of the third embodiment of the method of annealing a DST glass body, the upper annealing temperature can be set based on prior determinations of a crystallization onset temperature for the DST glass body, consolidated blank or the like. Under this approach, one or more samples of the DST glass body are processed through the steps of the third embodiment of the method through the controlled cooling phase (i.e., between the upper and lower intermediate temperatures). At this point, the samples are subjected to in situ HTXRD analytical testing at various potential upper annealing temperatures and times indicative of the annealing step (i.e., an annealing of the DST glass during or after the cooling step). From this information, it is possible to determine the maximum upper annealing temperatures and/or annealing durations that correspond to the onset of titania crystallization. Once that information has been obtained for a given DST composition and form, the upper annealing temperature and time for the annealing step can be adjusted within the third embodiment to ensure that the DST glass body does not develop substantial amounts of titania in crystalline form during actual processing (e.g., manufacturing) of the DST glass.

Referring to FIG. 1, two XRD plots of intensity as a function of 2θ from boron doped titania-silica glass bodies are provided. In FIG. 1, the left-hand XRD plot is obtained from a glass body subjected to crystal melting at 1670° C., cooled to room temperature at greater than 100° C./hr and then reheated at greater than 100° C./hr to 950° C. for about 6 hours. The right-hand XRD plot in FIG. 1 is obtained from a glass body subjected to crystal melting at 1670° C., cooled directly to an upper intermediate temperature of 950° C. at a cooling rate of greater than 100° C./hr, held at 950° C. for about 6 hours, and then cooled to room temperature at greater than 100° C./hr. From FIG. 1 (left-hand plot), it is evident that crystallinity has developed in the DST glass body (e.g., as evidenced by the increased intensity at certain 2θ angles designated by vertical lines, each indicative of the crystal structure of titania) subjected to heating at or above its crystal melting temperature, cooled to room temperature and then reheated as part of an annealing at 950° C. for 6 hours. In particular, the left-hand plot in FIG. 1 includes a substantial number of intensity peaks that correspond to 2θ angles (located at each vertical line beneath or intersecting the data trace) indicative of the crystal structure of titania. Conversely, no substantial amount of crystallinity has developed in the DST glass body subjected to cooling at an upper intermediate temperature of 950° C. for 6 hours during the cooling of the glass body directly from at or above the crystal melting temperature (right-hand plot). In particular, the right-hand plot in FIG. 1 only includes a few peaks corresponding to tungsten carbide material associated with the test apparatus, not the crystal structure of titania. As such, the XRD data in FIG. 1 can be used to tailor the process for making a boron-doped DST glass, particularly setting the upper intermediate temperature for the annealing step (e.g., as employed in the third embodiment of the annealing method of the disclosure), to avoid re-growth of titania crystals after the DST glass body has been subjected to heating at or above its crystal melting temperature.

The left-hand plot in FIG. 1 demonstrates that a boron-doped, DST glass body can be sensitive to titania recrystallization upon an annealing step conducted at 950° C. after the glass body has been subjected to heating at or above the crystal melting temperature for the DST glass body and cooled to room temperature. Evidently, the 950° C. upper annealing temperature selected for this boron-doped DST glass is above its XOT. The right-hand plot in FIG. 1, however, demonstrates that the DST glass body can be less sensitive to titania recrystallization upon a controlled cooling to an upper intermediate temperature conducted directly after the body has been subjected to heating at or above its crystal melting temperature (i.e., before the glass body has been cooled to room temperature or a temperature below the strain point of the glass). Evidently, the exposure of the boron-doped DST glass at about 950° C. for about 6 hours does not produce crystalline titania in this case. Although crystals can grow in this time at this temperature (as exhibited by the example in the left-hand plot in FIG. 1), there are evidently no crystal nuclei on which to grow the crystals since this sample had not been exposed to time at temperatures where nuclei can form. Without being bound by theory, it is believed that the upper intermediate temperature of 950° C. is within the titania crystal growth temperature range but above the titania nucleation growth temperature range for the DST glass depicted in FIG. 1.

In view of FIG. 1, without being bound by theory, cooling the boron-doped DST glass from at or above the CMT to room temperature (as subjected to the sample depicted in the left-hand plot), causes nuclei of crystalline titania to form in the glass and then grow when the DST glass is heated to a temperature, e.g., 950° C., (which is above the XOT for this particular composition) during the annealing. As noted earlier, one objective in conducting the annealing, besides relieving residual stresses, is to reduce the fictive temperature, $T_f$, of the glass. For the annealing to be effective in reducing the fictive temperature of the glass, the annealing should be conducted at a temperature close to the fictive temperature of the glass as it exists prior to the annealing. Accordingly, a controlled cooling step (as subjected to the sample depicted in the right-hand plot), can be included during the process step of cooling the DST glass after being subjected to the CMT. By subjecting the boron-doped DST glass to the controlled cooling, it is believed that the fictive temperature of the glass is reduced below the XOT. As such, a subsequent annealing of the DST glass at a temperature below the XOT will further reduce the fictive temperature of the glass and avoid crystallization of titania.

Figure 2:
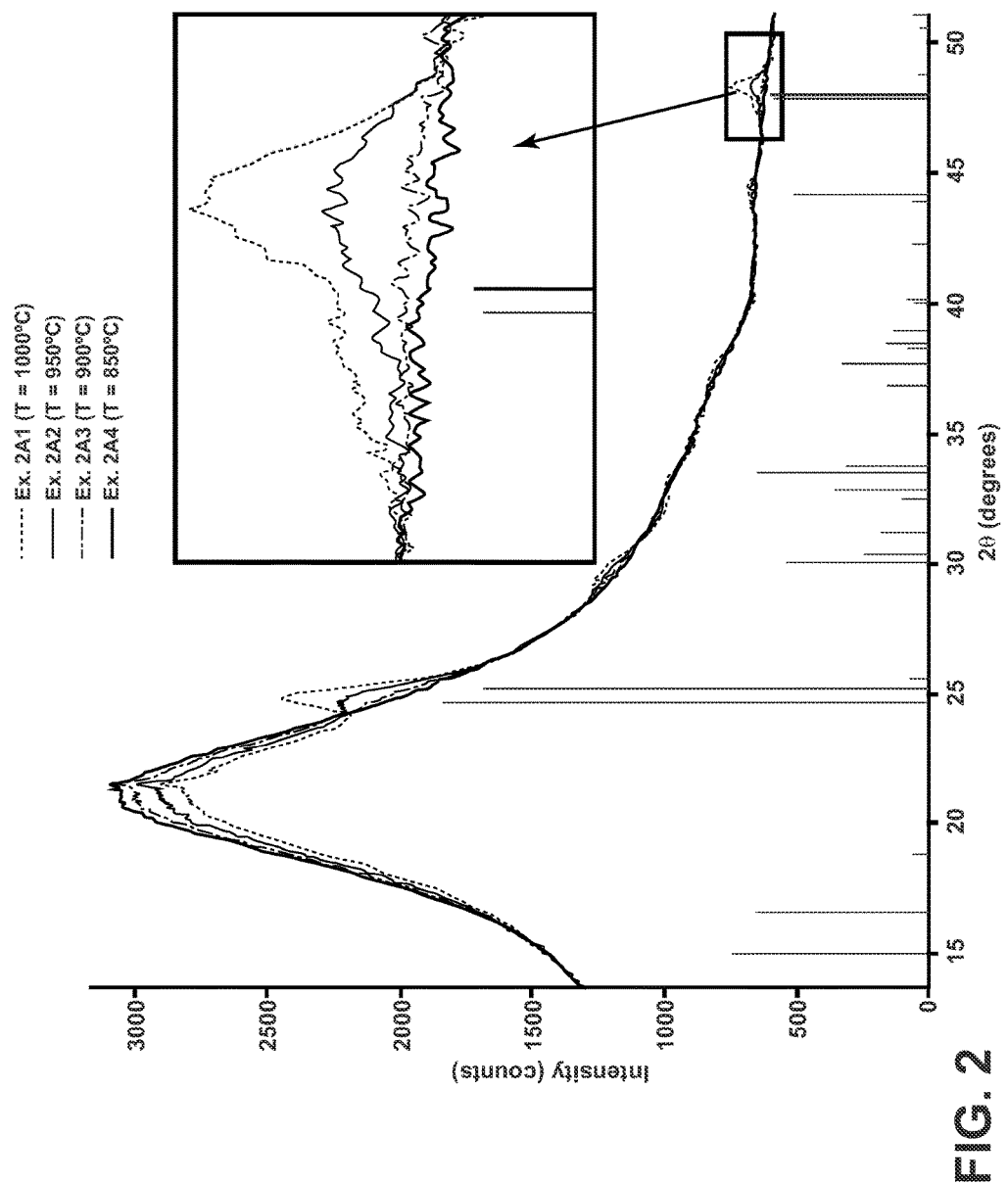
FIG. 2 is a series of high temperature x-ray diffraction ("HTXRD") plots of intensity as a function of 2θ from an unannealed boron doped titania-silica glass body heated to annealing temperatures of 850° C., 900° C., 950° C. and 1000° C. according to an aspect of the disclosure.

Referring to FIG. 2, a series of HTXRD plots of intensity as a function of 2θ from an unannealed boron-doped titania-silica glass body heated to annealing temperatures of 850° C., 900° C., 950° C. and 1000° C. is provided according to an embodiment of the foregoing methods of annealing DST glass bodies. That is, the unannealed boron-doped DST glass body depicted in FIG. 2 includes 1.84 wt. % $B_2O_3$ and has been subjected to crystal melting at about 1650° C. to 1670° C. for 1 to 3 hours (i.e., at or above the CMT for this DST glass body), cooled to room temperature, and then reheated to annealing temperatures of 850° C., 900° C., 950° C. and 1000° C. (designated as "Ex. 2A1," "Ex. 2A2", "Ex. 2A3" and "Ex. 2A4", respectively). As these series of plots indicate, increased counts are observed at various 2θ angles corresponding to crystalline titania upon annealing the boron-doped DST glass body at 950° C. and 1000° C. (Exs. 2A1 and 2A2), indicative of the formation of substantial amounts of titania crystals in these glass bodies. Conversely, no such intensity increases are evident in the plots corresponding to the boron-doped DST glass body as annealed at 850° C. and 900° C. (Exs. 2A3 and 2A4). As such, the HTXRD data in FIG. 2 can be used to determine the onset of titania crystallization for this boron-doped DST glass— i.e., the XOT for this DST glass. The XOT can then be used to set an appropriate upper annealing temperature (e.g., to an upper annealing temperature of 900° C. or lower) for a process of annealing this particular boron-doped DST glass body to avoid growth of titania crystals.

The doped DST glass and glass bodies of this disclosure can be used to make photo mask blanks or projection optics mirror substrates, for example. The DST glass can also be used to make smaller blanks which can then be used to form the critical zone of a mirror blank of a projection optics system in a EUVL stepper. Halogen doping (e.g., doping with F) can be achieved during consolidation of a regular titania-silica blank processed via outside vapor deposition ("OVD"). Alternatively, shapes and articles made by either soot-pressing or sol-gel method can be doped with the halogen dopant during consolidation.

For EUV lithography employing DST glass articles according to this disclosure, it is important that the expansivity of lithographic elements be maintained as close to zero as possible over the widest possible operational temperature range. A "zero expansivity" means that the material neither expands nor contracts.

Employing DST glass with reduced expansivity provides an important benefit for projection optics mirror blanks as well as photomask blanks for EUVL steppers. The DST glass described herein has a reduced CTE slope (the slope is a measurement of the instantaneous change in CTE (ppb/K) versus temperature (in K)) which will allow EUVL stepper makers to use higher source power because of the improved thermal and/or dimensional stability of the DST glass detailed in this disclosure. The DST glass described herein will also enable EUVL users to achieve much higher resolution. Further, the DST glass described herein can be used in small quantities for the critical zone in a projection optics mirror which will help lower the cost of large projection optics mirrors that possess a diameter in the range of 10 cm to 60 cm.

The tuning of the DST glass according to this disclosure (e.g., a DST glass with a halogen dopant such as fluorine, or a DST glass doped with $B_2O_3$ and/or OH) for optimal performance in a specified application depends on the details of the operating conditions in which the glass will be used. The combination of adjustments in $TiO_2$ concentration and the fictive temperature, $T_f$, enables the adjustment of the two crossover temperatures, $T_{ZC1}$ and $T_{ZC2}$, and also the expansivity maximum to optimize performance in each application. Without doping, $T_{ZC1}$ of silica-titania glass can be adjusted by manipulation of $TiO_2$ concentration alone. Slow annealing can also be used to lower the expansivity slope and bring $T_{ZC2}$ to lower levels. However, an extremely low expansivity of +/−3 ppb/K over a range of tens of degrees Celsius (° C.) can only be obtained at temperatures in the neighborhood of the expansivity maximum. Thus, such a desirable regime can only be obtained in the undoped-conventional annealed glass at temperatures starting at ~150° C. In contrast, the use of doping in the silica-titania glass, e.g., as DST glass described herein, significantly enlarges the adjustment range of $T_{ZC}$, thus enabling an extremely low expansivity range to exist at temperatures starting at around room temperature. This situation is particularly beneficial for the application of the DST glass as a substrate for EUV masks and optics, whose temperature range of operation starts at room temperature. Since different components in an EUV system are exposed to different temperature variations, and as EUV system design and operation regimes depend on the evolution of developments in other areas such as system numerical aperture ("NA"), resist speed and source light intensity, no single combination of glass composition and $T_f$ is ideal for all situations. Manipulation of $T_{ZC}$ over a wide temperature range thus enables tuning of the material to the specific requirements in each particular application.

According to some embodiments, a DST glass is provided that contains up to 1.5 wt. % halogens, preferably fluorine (e.g., from about 0.7 to 1.5 wt. % F). Other aspects of the DST glass are provided with a $B_2O_3$ dopant at 1.5 to 5 wt. %, OH dopant at 1000 to 3000 ppm, or $B_2O_3$ and OH dopants at 0.5 to 2.5 wt. % and 100 to 1400 ppm, respectively. The halogen doping is typically completed during and/or before the consolidation step of the glass process. Doping of the $B_2O_3$ and/or OH is typically completed before the consolidation step.

Doping of halogens during the consolidation step enables the making of an initial-doped soot blank by different methods including but not limited to OVD, soot pressing of premade silica-titania soot, and sol-gel of premade silica-titania soot. In the OVD process, a soot blank is made in a burner by the combustion of a silica precursor and a titania precursor. The soot is then collected on a mandrel and treated with a halogen-containing gas, such as fluorine-derived from $SiF_4$. The soot is then consolidated, and then collected to form a DST glass.

In a soot pressing process for preparing the DST glass, premade titania-silica soot is developed by the combustion of a silica precursor and a titania precursor in a burner. The soot, which is essentially in a particulate form, is collected in a vessel; and during and/or after the collection of the soot, the soot is treated with a halogen-, B-, and/or OH-containing dopant precursor while or before pressing the soot at consolidation temperatures to form the DST glass.

In a sol-gel process employed to prepare a DST glass, silica-titania soot is made and then formed into an interim shape using a sol-gel process. The shape is then dried to form porous silica-titania articles that are then treated with a halogen-, B-, and/or OH-containing gas during consolidation (i.e., to introduce the dopant(s) into the DST glass). In an embodiment, one or more dopant precursors are added to the sol-gel interim shape before it is formed into a final shape, dried and treated with the dopant-containing gas during consolidation. Consolidation may be carried out in air or in an air-inert gas mixture.

There are other methods known in the art that can be used to make the silica-titania soot which can then be treated with a dopant-containing gas during consolidation. While it is possible to make silica-titania soot and immediately consolidate it in a dopant-containing atmosphere to form a DST glass (i.e., without any intermediate step such as forming a soot blank and consolidating the blank), this method is not favored because of environmental and possible health hazards. For example, an expensive scrubber system would be required to prevent halogens such as chlorine and fluorine from escaping into the atmosphere and harming persons working nearby.

When the halogen dopant employed in the DST glass is fluorine, the fluorine-containing gas employed during processing can be $F_2$, $CF_4$, $SF_6$, $SiF_4$ or other volatile fluorine-containing compounds mixed with a carrier gas, for example air. These fluorine-containing gases are selected to produce a target F concentration in the DST glass. When compounds such as $CF_4$ and $SF_6$ are used as the fluorinating agent, oxygen is present in the carrier gas in order to convert the non-fluorine portion of the fluorinating agent (C, Si or S) to a volatile species, for example $CO_2$, SiO or $SO_2$, which is swept out of the system by the carrier gas. The carrier gas can also be an inert gas, for example nitrogen, helium or argon, However, when inert gases are used as the carrier gas for $CF_4$, $SiF_4$ and $SF_4$, oxygen should be present as indicated above. Halogens, in addition to doping the glass, can dehydrate the glass. In particular, the halogen will reduce the number of hydroxyl groups (e.g., OFF groups) that may be present in the glass. Dehydration can also be effected using a mixture of chlorine and fluorine, or sequentially by first dehydrating using chlorine and then using a fluorine-containing species such as those described above to dope the glass with fluorine.

According to some embodiments of the disclosure, the consolidation temperature employed in the method of making the DST glass bodies and articles will depend on the method of soot blank preparation and can vary from 1250° C. to 1670° C., e.g., 1300° C. for an OVD process to 1670° C. for other processes such as soot pressing and sol-gel. If $TiO_2$ crystallites are present after consolidation, the DST glass can be heated to about 1550° C., 1650° C., or even as high as 1700° C. to remove them.

After fabrication, the expansivity of the DST glass can be measured by a sandwich seal method in a temperature range of −50° C. to 150° C. with a precision of ±0.05 ppb/K². The sandwich seal method is outlined in H. Hagy, "High Precision Photoelastic and Ultrasonic Techniques for Determining Absolute and Differential Thermal Expansion of Titania-Silica Glasses," *Applied Optics*, vol. 12, No. 7, July 1973, pp. 1440-46, incorporated by reference herein. The fictive temperature $T_f$ of the annealed glass can be measured using a Fourier transform infrared spectroscopy ("FTIR") technique with a precision of ±10° C. A suitable FTIR method for measuring $T_f$ is outlined in A. Agarwal et al., "A Simple IR spectroscopic method of determining fictive temperature of silica glasses," *J. of Non-Crystalline Solids*, vol. 185, 1995, pp. 191-98, incorporated by reference herein.

A reduction in expansivity slope of at least about 20% over conventional glass has been observed for DST glass prepared in accordance with aspects of this disclosure (e.g., from 1.6 ppb/K² down to 1.3 ppb/K² at 20° C.). Many aspects of the DST glass articles in the disclosure achieve a 63% reduction in expansivity slope over conventional ULE glass (e.g., from 1.6 ppb/K² down to 0.6 ppb/K² at 20° C.). In general, the data suggests that the improved expansivity slope obtained for the DST glass according to this disclosure is largely dictated by reduced fictive temperatures, $T_f$, for this ternary system (e.g., halogen-doped silica-titania glass). Continued improvements in expansivity slope are expected based on further reductions to $T_f$ via halogen, $B_2O_3$, and/or OH dopant levels and the controlled annealing and cooling cycles of the methods disclosed herein.

Example One

Figure 3A:
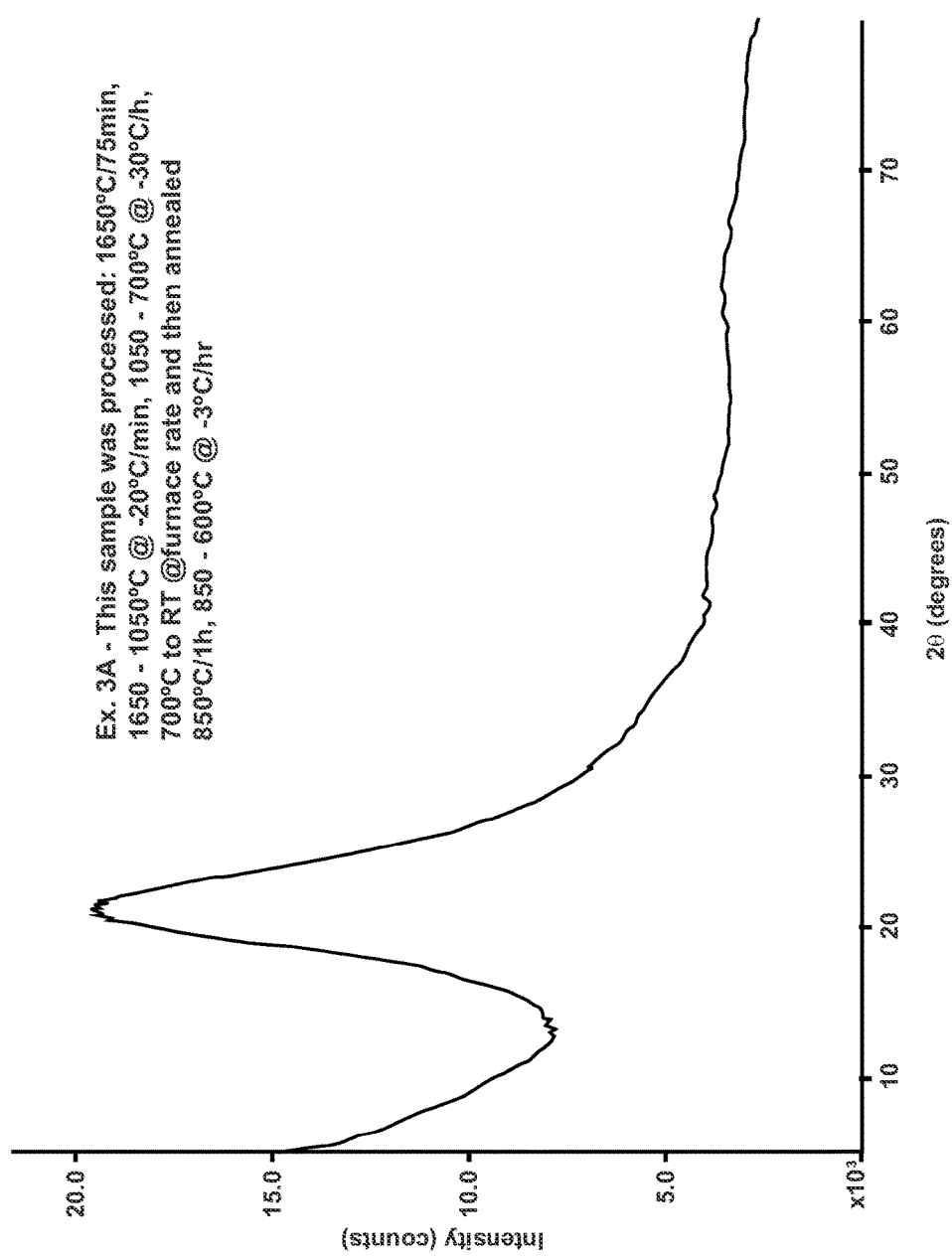
FIGS. 3A-3B are XRD plots of intensity as a function of 2θ for a boron-doped titania-silica glass body processed according to an aspect of the disclosure and processed according to a conventional annealing approach, respectively.
Figure 3B:
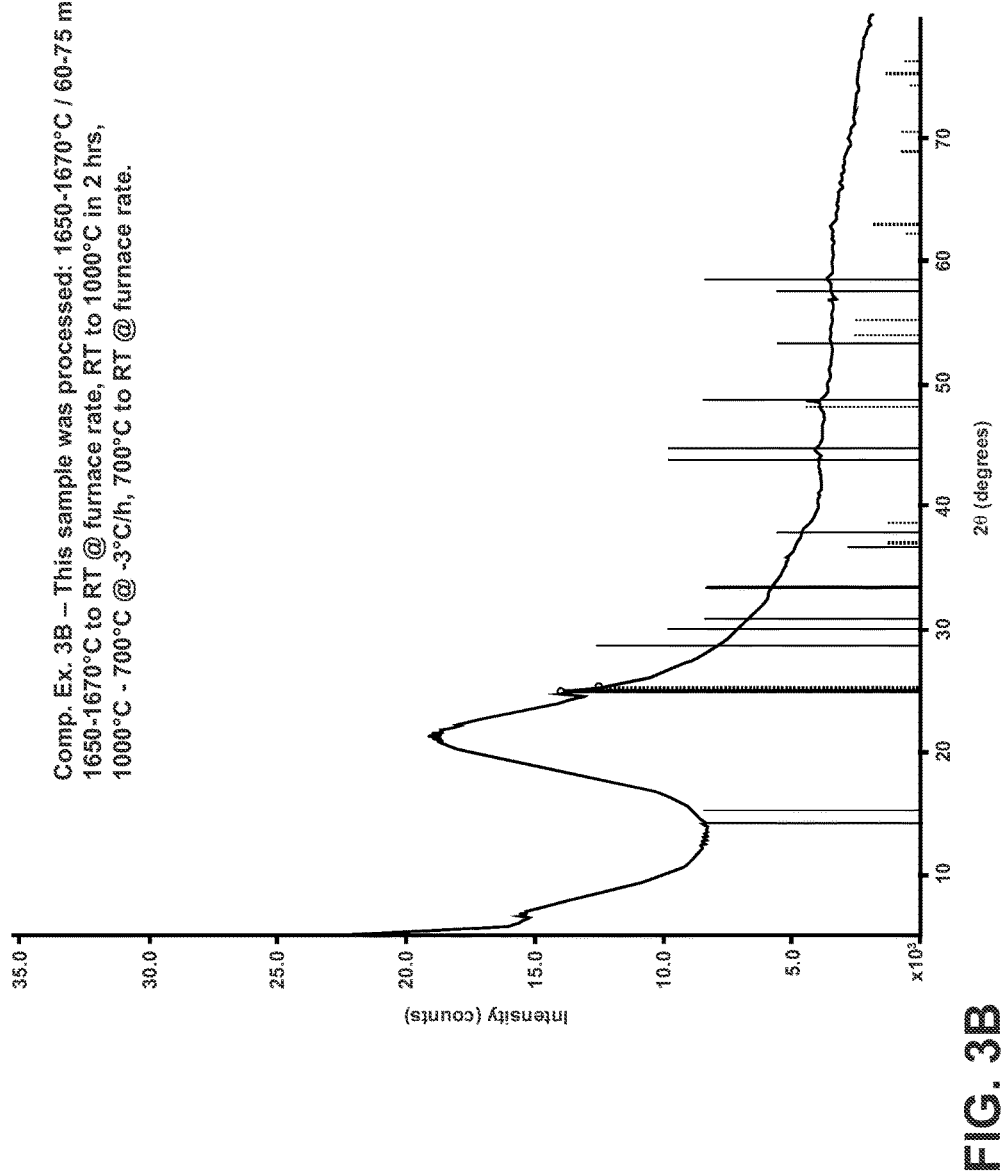

Referring to FIGS. 3A & 3B, XRD plots of intensity as a function of 2θ are provided for a boron-doped titania-silica glass body processed according to the third embodiment of the method for annealing a DST glass and processed according to a conventional annealing approach, respectively. The sample depicted in FIG. 3B is a comparative sample with regard to the sample depicted in FIG. 3A. In particular, the DST glass body depicted in FIGS. 3A & 3B (designated "Ex. 3A" & "Comp. Ex. 3B," respectively) has the following composition: 3 wt. % $B_2O_3$, 10.7 wt. % $TiO_2$ and a balance of $SiO_2$. Further, a XOT of 950° C. was measured for the DST glass body depicted in FIGS. 3A & 3B using XRD techniques. In addition, an anneal point of 895° C. and a strain point of 790° C. were obtained for Ex. 3A & Comp. Ex. 3B using glass viscosity measurements.

With regard to processing, the DST glass body sample depicted in FIG. 3A, designated Ex. 3A, was prepared according to an implementation of the third embodiment of the annealing method with a controlled cooling and annealing according to the following schedule: (a) heating from room temperature to 1650° C., at or above the CMT for this particular composition, and holding for about 75 minutes; (b) cooling from at or above the CMT to 1050° C., an upper intermediate temperature for this implementation, at a fast cooling rate of 20° C./min (1000° C./hr); (c) cooling from the upper intermediate temperature to 700° C., a lower intermediate temperature for this implementation, at a relatively fast cooling rate of 30° C./hour; (d) cooling from the lower intermediate temperature to room temperature at a furnace cooling rate (i.e., the natural cooling rate of the DST glass body in the furnace with power removed from its heating elements); (e) re-heating back up to 850° C. (in about 90 minutes), an upper annealing temperature, and annealing for about an hour at 850° C.; (f) annealing from the upper annealing temperature to 600° C., a lower annealing temperature, at a cooling rate of 3° C./hour; and (g) cooling from the lower annealing temperature to room temperature at a furnace cooling rate. In contrast, the DST glass body sample depicted in FIG. 3B, designated Comp. Ex. 3B, was prepared according to a conventional anneal process according to the following schedule: (a) heating from room temperature to 1650° C. and holding for about 75 minutes; (b) cooling from at or above the CMT to room temperature at a furnace cooling rate; (c) re-heating from room temperature back up to 1000° C. and annealing at 1000° C. for about 1 hour; (d) annealing from 1000° C. to 700° C. at a cooling rate of 3° C./hour; and (e) cooling from 700° C. to room temperature at a furnace cooling rate.

Referring again to FIGS. 3A and 3B, it is evident that the comparative example, Comp. Ex. 3B, that was processed according to a conventional annealing process, developed titania crystals. In contrast, Ex. 3A, which was processed according to the third embodiment of the method of making a DST glass, did not develop titania crystals. These results are also manifested in CTE and expansivity slope measurements obtained from Ex. 3A and Comp. Ex. 3B. In particular, Ex. 3A exhibited a CTE of 89 ppb/K and an expansivity slope of 0.77 ppb/K² at 20° C.; and Comp. Ex. 3B exhibited a CTE of 300 ppb/K.

Example Two

Figure 4A:
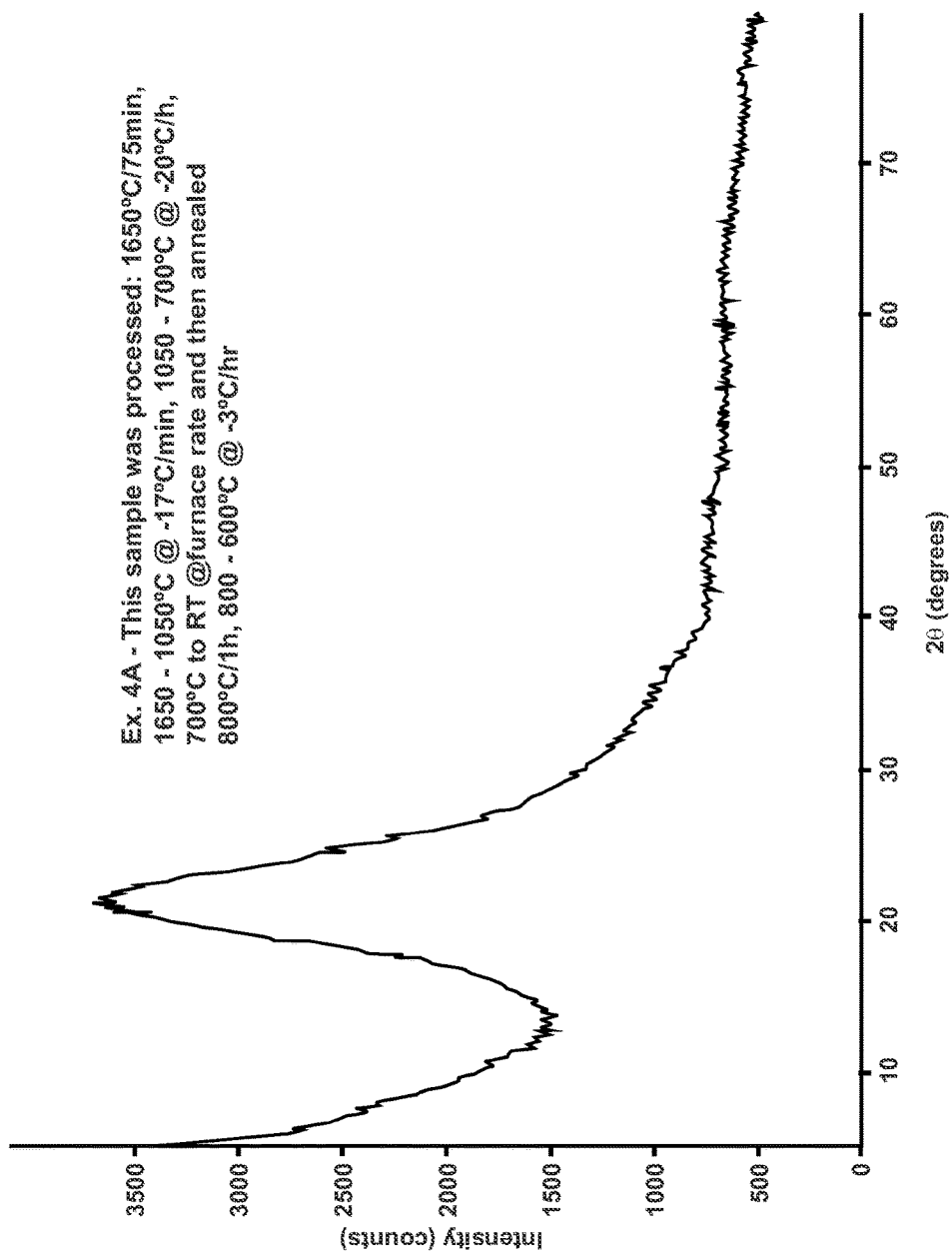
FIGS. 4A-4B are XRD plots of intensity as a function of 2θ for a boron-doped titania-silica glass body processed according to an aspect of the disclosure and processed according to a conventional annealing approach, respectively.
Figure 4B:
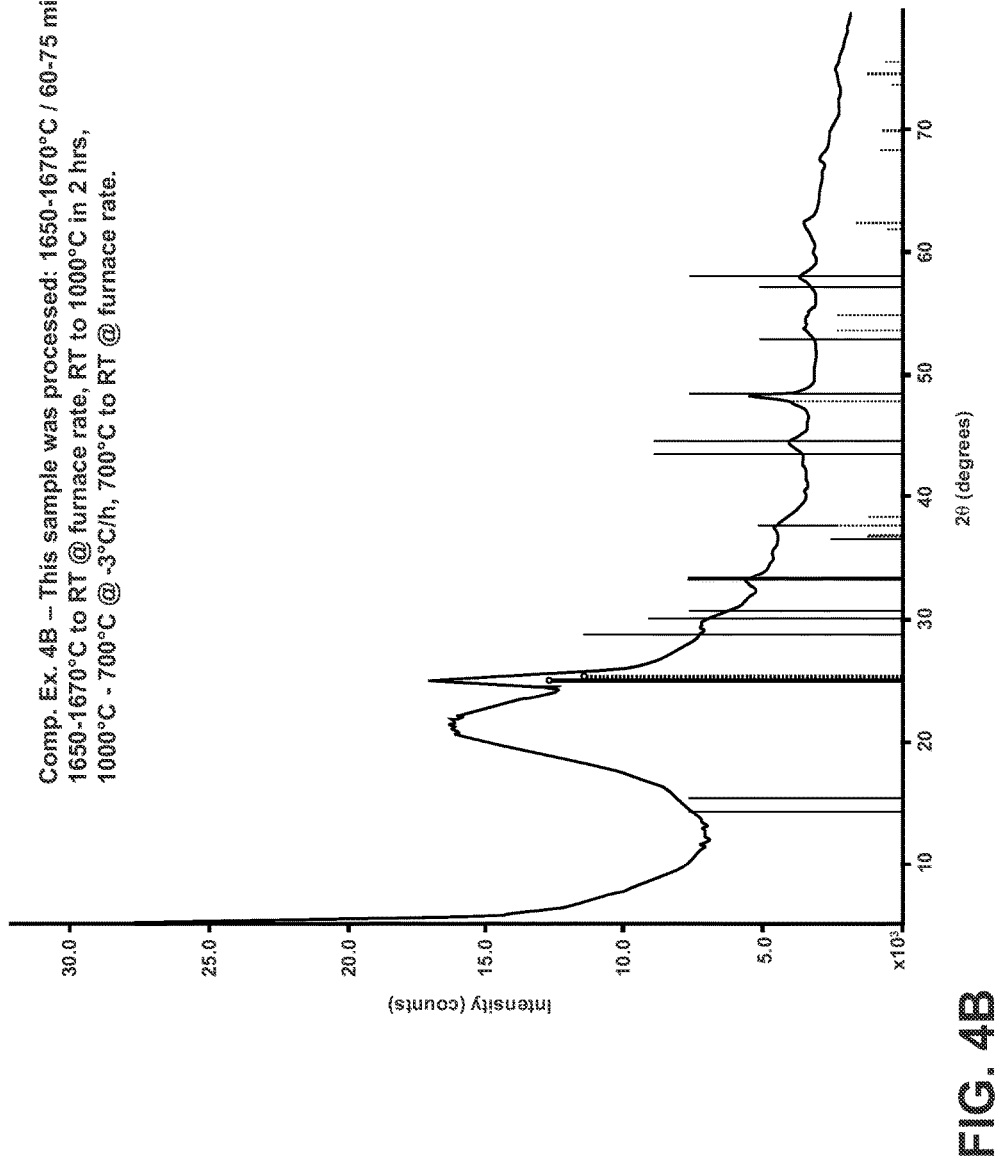

Referring to FIGS. 4A & 4B, XRD plots of intensity as a function of 2θ are provided for a boron-doped titania-silica glass body processed according to an implementation of the third embodiment of the method for annealing a DST glass and processed according to a conventional annealing approach, respectively. The sample depicted in FIG. 4B is a comparative sample with regard to the sample depicted in FIG. 4A. In particular, the DST glass body depicted in FIGS. 4A & 4B (designated "Ex. 4A" & "Comp. Ex. 4B," respectively) has the following composition: 2.49 wt. % $B_2O_3$, 12.4 wt. % $TiO_2$ and a balance of $SiO_2$. Further, a XOT of 850° C. was measured for the DST glass body depicted in FIGS. 4A & 4B using XRD techniques.

With regard to processing, the DST glass body sample depicted in FIG. 4A, designated Ex. 4A, was prepared according to an implementation of the third embodiment of the annealing method with a controlled cooling and annealing according to the following schedule: (a) heating from room temperature to 1650° C., at or above the CMT for this particular composition, and holding for about 75 minutes; (b) cooling from at or above the CMT to 1050° C., an upper intermediate temperature for this implementation, at a fast cooling rate of 20° C./min (1000° C./hr); (c) cooling from the upper intermediate temperature to 700° C., a lower intermediate temperature for this implementation, at a relatively fast cooling rate of 30° C./hour; (d) cooling from the lower intermediate temperature to room temperature at a furnace cooling rate; (e) re-heating back up to 800° C. (in about 90 minutes), an upper annealing temperature, and annealing for about an hour at 800° C.; (f) annealing from the upper annealing temperature to 600° C., a lower annealing temperature, at a cooling rate of 3° C./hour; and (g) cooling from the lower annealing temperature to room temperature at a furnace cooling rate. In contrast, the DST glass body sample depicted in FIG. 4B, designated Comp. Ex. 4B, was prepared according to a conventional anneal process according to the following schedule: (a) heating from room temperature to 1650° C. (e.g., at or above the CMT for this DST glass body) and holding for about 75 minutes; (b) cooling from at or above the CMT to room temperature at a furnace cooling rate; (c) re-heating from room temperature back up to 1000° C. and annealing at 1000° C. for about 1 hour; (d) annealing from 1000° C. to 700° C. at a cooling rate of 3° C./hour; and (e) cooling from 700° C. to room temperature at a furnace cooling rate.

Referring again to FIGS. 4A and 4B, it is evident that the comparative example, Comp. Ex. 4B, that was processed according to a conventional annealing process developed titania crystals. In contrast, Ex. 4A, which was processed according to the method of making a DST glass, did not develop titania crystals. These results are also manifested in CTE and expansivity slope measurements obtained from Ex. 4A and Comp. Ex. 4B. In particular, Ex. 4A exhibited a CTE of −28 ppb/K and an expansivity slope of 1.39 ppb/K² at 20° C.; and Comp. Ex. 4B exhibited a CTE of +1038 ppb/K.

It will be apparent to those skilled in the art that various modifications and variations can be made without departing from the spirit or scope of the claims.

What is claimed is:

1. A doped silica-titania glass article, comprising:
a glass article having a glass composition comprising
(i) a silica-titania base glass containing titania at 7 to 14 wt. % and a balance of silica, and
(ii) a dopant selected from the group consisting of (a) $B_2O_3$ at 1.5 to 5 wt. %, (b) OH at 1000 to 3000 ppm, and (c) $B_2O_3$ at 0.5 to 2.5 wt. % and OH at 100 to 1400 ppm,
wherein the glass article has an expansivity slope of less than about 1.3 ppb/$K^2$ at 20° C.

2. The article of claim 1, wherein the dopant is $B_2O_3$ at 1.5 to 5 wt. %, the expansivity slope is less than about 1.1 ppb/$K^2$ at 20° C. and OH is present in the glass composition at less than 100 ppm.

3. The article of claim 1, wherein the dopant is OH at 1000 to 3000 ppm, and the expansivity slope is less than about 1.3 ppb/$K^2$ at 20° C.

4. The article of claim 1, wherein the dopant is $B_2O_3$ and OH at 0.5 to 2.5 wt. % and 100 to 1400 ppm, respectively, and the expansivity slope is less than about 1.1 ppb/$K^2$ at 20° C.

5. The article of claim 1, wherein the glass composition is substantially free of titania in crystalline form.

6. A method for annealing a doped silica-titania glass body, comprising the steps:
heating the glass body to at or above the crystal melting temperature of the glass body for 30 minutes or longer, the glass body comprising a silica-titania based glass composition containing titania at 7 to 14 wt. % and at least one additional dopant selected from the group consisting of F, B, and OH, the glass body having a strain point and an annealing point;
cooling the glass body from at or above the crystal melting temperature to a temperature below the strain point; and
annealing the glass body after, or during, the step for cooling the glass body, the annealing conducted from an upper annealing temperature set at least about 50° C. below a crystallization onset temperature of the glass body down to a lower annealing temperature at a cooling rate from about 30° C./hour to about 0.01° C./hour,
wherein the glass body exhibits an expansivity slope of less than about 1.3 ppb/$K^2$ at 20° C. after the annealing step.

7. The method of claim 6, wherein the at least one additional dopant is selected from the group consisting of (a) F at 0.7 to 1.5 wt. %, (b) $B_2O_3$ at 1.5 to 5 wt. %, (c) OH at 1000 to 3000 ppm, and (d) $B_2O_3$ at 0.5 to 2.5 wt. % and OH at 100 to 1400 ppm.

8. The method of claim 6, wherein the upper annealing temperature is from about 60° C. greater than the strain point to about 20° C. less than the strain point.

9. The method of claim 8, wherein the crystallization onset temperature is determined from prior-obtained high temperature x-ray diffraction data from the glass body.

10. The method of claim 8, wherein the annealing is conducted after the step for cooling the glass body, and the step for cooling the glass body from at or above the crystal melting temperature is conducted at a cooling rate of at least 100° C./hour.

11. The method of claim 8, wherein the annealing is conducted during the step for cooling the glass body, and the step for cooling the glass body comprises cooling the glass body from at or above the crystal melting temperature is conducted at a cooling rate of at least 100° C./hour to the upper annealing temperature.

12. The method of claim 10, wherein the at least one additional dopant is F at 0.7 to 1.5 wt. % and the glass body further comprises OH at less than 10 ppm, and further wherein the glass body exhibits an expansivity slope of less than about 0.6 ppb/$K^2$ at 20° C. after the annealing step.

13. The method of claim 11, wherein the at least one additional dopant is F at 0.7 to 1.5 wt. % and the glass body further comprises OH at less than 10 ppm, and further wherein the glass body exhibits an expansivity slope of less than about 0.6 ppb/$K^2$ at 20° C. after the annealing step.

14. The method of claim 6, wherein the step for cooling the glass body from at or above the crystal melting temperature to a temperature below the strain point further comprises:
cooling the glass body from at or above the crystal melting temperature at a cooling rate of 100° C./hour or greater down to an upper intermediate temperature above about 50° C. below the annealing point; and
cooling the glass body from the upper intermediate temperature down to a lower intermediate temperature from about 20° C. greater than the strain point to about 250° C. less than the strain point at a cooling rate of about 20° C./hour to about 30° C./hour.

15. The method of claim 14, wherein the at least one additional dopant is $B_2O_3$ at 1.5 to 5 wt. % and the glass body further comprises OH at less than 100 ppm, and further wherein the glass body exhibits an expansivity slope of less than about 1.1 ppb/$K^2$ at 20° C. after the annealing step.

16. The method of claim 14, wherein the at least one additional dopant is OH at 1000 to 3000 ppm, and further wherein the glass body exhibits an expansivity slope of less than about 1.3 ppb/$K^2$ at 20° C. after the annealing step.

17. The method of claim 14, wherein the at least one additional dopant is $B_2O_3$ at 0.5 to 2.5 wt. % and OH at 100 to 1400 ppm, and further wherein the glass body exhibits an expansivity slope of less than about 1.1 ppb/$K^2$ at 20° C. after the annealing step.

18. The method of claim 14, wherein the annealing is conducted after the step for cooling the glass body, and the step for cooling the glass body from at or above the crystal melting temperature to a temperature below the strain point further comprises:
cooling the glass body from the lower intermediate temperature down to a temperature below the strain point at a cooling rate of 100° C./hour or greater.

19. The method of claim 14, wherein the annealing is conducted during the step for cooling the glass body, the annealing further comprises:
heating the glass body from the lower intermediate temperature to the upper annealing temperature.

20. The method of claim 14, wherein the upper annealing temperature is from about 60° C. greater than the strain point to about 20° C. less than the strain point.

21. The method of claim 20, wherein the crystallization onset temperature is determined from prior-obtained high temperature x-ray diffraction data from the glass body.

22. The article of claim 1, wherein the glass article is further characterized by a crystallization onset temperature (XOT) of less than 1050° C.

* * * * *

UNITED STATES PATENT AND TRADEMARK OFFICE
CERTIFICATE OF CORRECTION

PATENT NO. : 9,932,261 B2
APPLICATION NO. : 15/297534
DATED : April 3, 2018
INVENTOR(S) : Sezhian Annamalai et al.

It is certified that error appears in the above-identified patent and that said Letters Patent is hereby corrected as shown below:

On the Title Page

On page 2, Column 2, item (56), other publications, Line 3, delete "Ultraloin" and insert --Ultralow--, therefor.

In the Claims

In Column 24, Line 2-3, Claim 11, after "temperature" delete "is conducted".

Signed and Sealed this
Sixteenth Day of June, 2020

Andrei Iancu
*Director of the United States Patent and Trademark Office*